March 27, 1962 A. M. SLAUGHTER 3,026,995
LUNCH SAFE
Filed Aug. 4, 1959 3 Sheets-Sheet 2
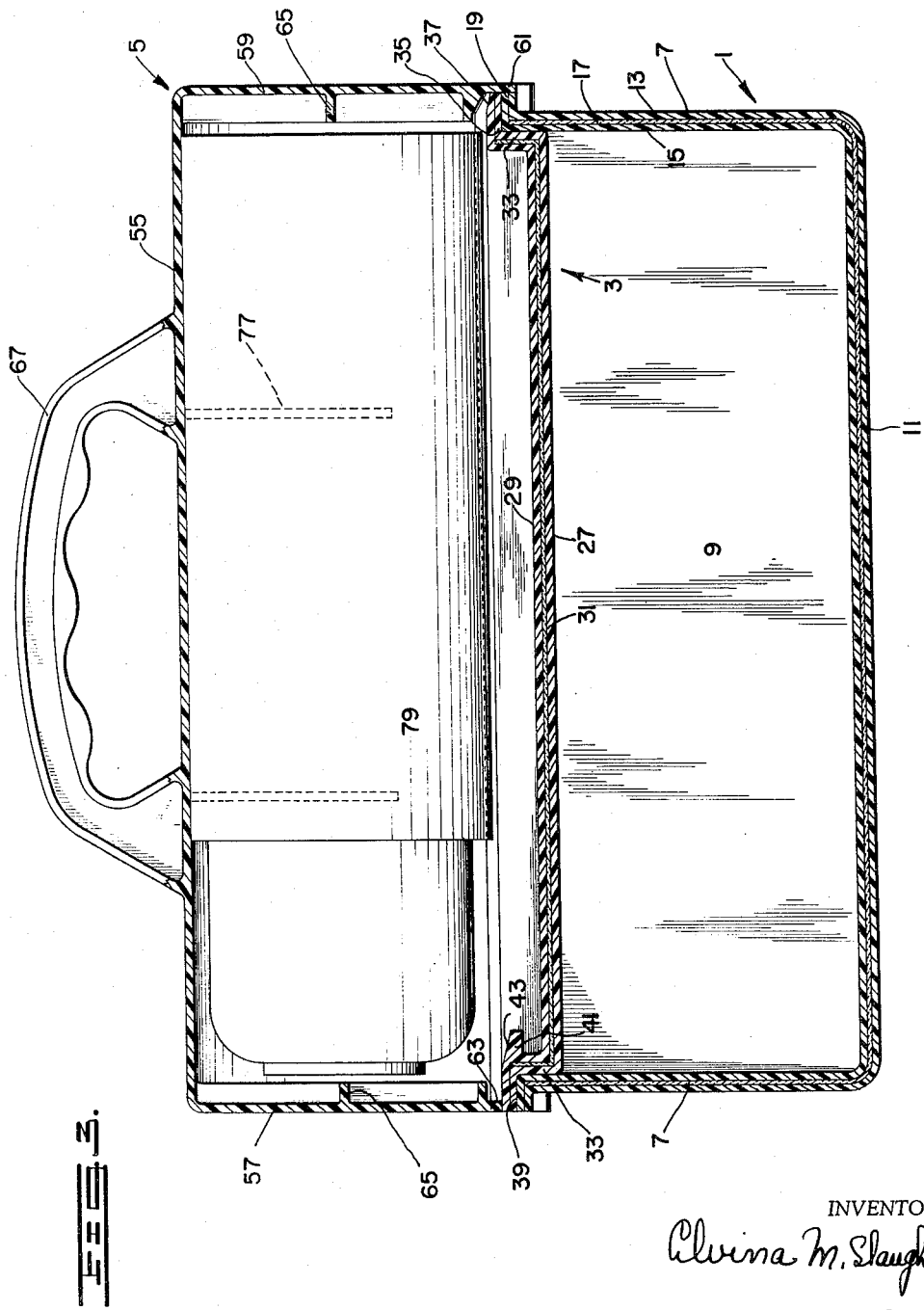
INVENTOR
Alvina M. Slaughter
BY
Peck + Peck
ATTORNEYS March 27, 1962 A. M. SLAUGHTER 3,026,995
LUNCH SAFE
Filed Aug. 4, 1959 3 Sheets-Sheet 3
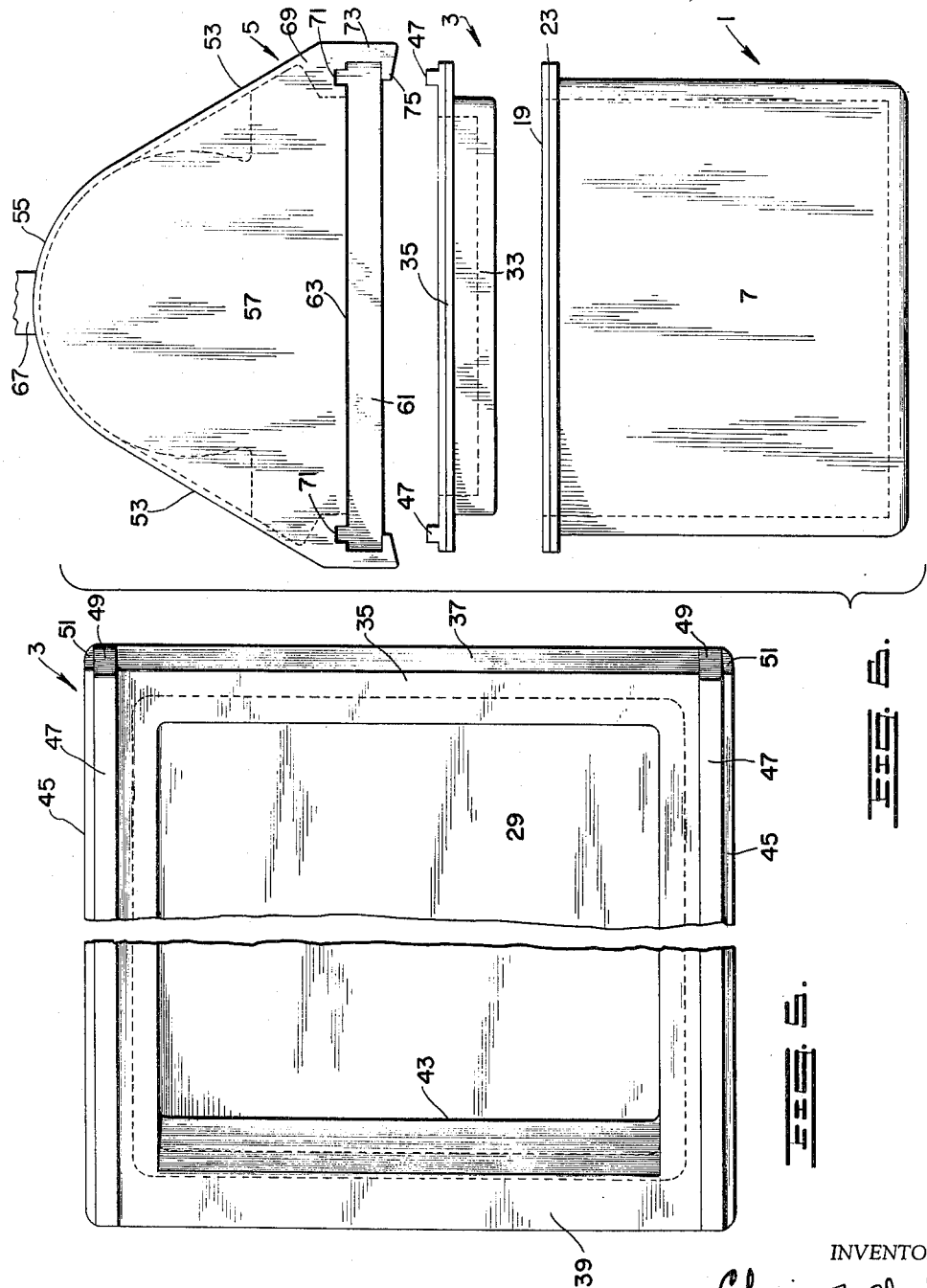
INVENTOR
Alvina M. Slaughter
BY
Peck & Peck
ATTORNEYS

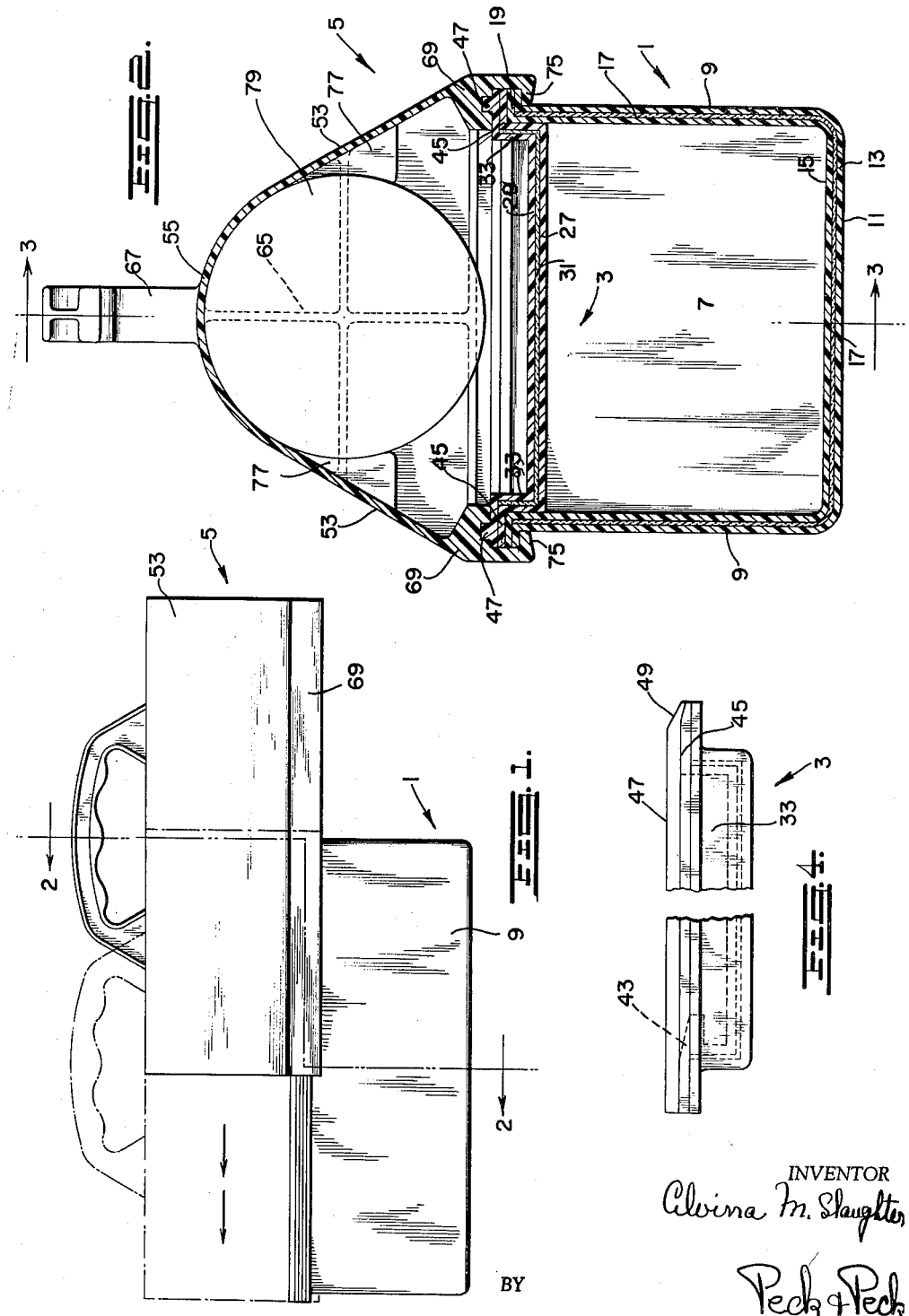

United States Patent Office 3,026,995
Patented Mar. 27, 1962

3,026,995
LUNCH SAFE
Alvina M. Slaughter, 2494 Dale Road,
Huntingdon Valley, Pa.
Filed Aug. 4, 1959, Ser. No. 831,672
5 Claims. (Cl. 206—4)

This invention relates broadly to the art of lunch safes and in its more specific aspects it relates to portable containers in which the user may carry his meal consisting of foodstuffs and liquids with the assurance that it will be maintained in edible condition; and the nature and objects of the invention will be readily recognized and understood by those skilled in the arts to which it relates in the light of the following explanation and detailed description of the accompanying drawings illustrating what I at present believe to be preferred embodiments or mechanical expressions of my invention from among the various other forms, arrangements, combinations and constructions, of which the invention is capable within the spirit and scope thereof.

Persons in all walks of life have occasion to carry foodstuffs and drinks from the point of preparation thereof to a remote point where the food and drink is consumed. Lunch safes, or as they are sometimes called, "dinner pails" have been known and in use for many years, but it has been my experience that the lunch safes of the prior art are unsatisfactory for a variety of reasons. Perhaps the major defect or objectionable characteristics of prior lunch safes or lunch boxes is their inability to maintain the food which they contain in good and edible condition from the time the lunch safe is packed until the time the contents thereof are consumed. This spoilage of food packed in the lunch safes now known and in use is not only dangerous to the health of the user or carrier of the portable lunch safe but is also uneconomic in its food wastage. Not only did spoilage occur during the hot summer months but food was often so chilled by contact with the cold metal walls of the lunch safe during cold weather that it was unpalatable.

The prior lunch safes of which I am aware are not fully sanitary, they are not fully and completely insulated, they will rust and are not completely washable. Many are relatively heavy and unattractive in appearance and in many instances are not easy to open and close. There are other disadvantageous features which are inherent in the design and construction of prior art lunch safes and these as well as those mentioned above, have been eliminated in the construction and arrangement of the lunch safe which I have devised.

I have provided a lunch safe of laminated construction provided with insulating means between the laminae so that the contained foodstuffs will be maintained in fresh and edible condition regardless of the temperature in which the lunch safe is being used. The lunch safe of this invention comprises a separable assembly of several components which have been designed for ease of assembly and disassembly to expedite the opening and closing of the lunch safe. Not only have I provided for ease of assembly and disassembly but I have also designed and constructed my lunch safe so that when the components thereof are in assembled condition the interior food storage compartments thereof will be sealed and insulated from the exterior atmosphere. This full and complete closing or sealing of the lunch safe requires no extraneous clamps, straps or the like and automatically occurs when the cover is positioned to close the lunch safe, as will be explained in detail hereinafter.

I prefer to construct my lunch safe from a plastic material which may be a polyethylene plastic. The lunch safe is completely sanitary for it is of seamless plastic construction and may, of course, be washed. This invention provides a lunch safe without sharp corners, hinges or locks and the like.

The lunch safe which I have devised will not chip, will not rust and being light in weight and fabricated of plastic material is substantially noiseless which is not the case with prior metal lunch safes. The lunch safe of this invention is of attractive design and is comfortably carried.

My lunch safe is not only insulated and air tight but is waterproof and will not sink if dropped in water, thus, if it is accidentally dropped in water it may be retrieved and the contents thereof will not have been subject to water damage. This attribute is significant when it is appreciated that lunch safes are used by sportsmen and others whose duties require them to be on or near the water.

My lunch safe is of durable construction and under relatively normal use conditions will last indefinitely. The invention is economical to produce and may be fabricated under mass production techniques.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

FIG. 1 is a view in elevation of the lunch safe with the cover partly removed therefrom.

FIG. 2 is a view taken on line 2—2 of FIG. 1.

FIG. 3 is a section view in elevation of the lunch safe taken on line 3—3 of FIG. 2.

FIG. 4 is a side view in elevation of the container lid of the lunch safe.

FIG. 5 is a top plan view of the container lid of the lunch safe.

FIG. 6 is an end elevation of the three components of the lunch safe assembly in exploded condition.

The lunch box disclosed herein comprises a separate assembly of three components, a storage box, a lid therefor and a cover for the assembly, which I have designed generally by the numerals 1, 3 and 5, respectively.

The storage box 1 which is preferably, though not necessarily, of generally rectangular construction constitutes the main compartment of the assembly in which the food is carried and/or stored and may, of course, be of variable or any suitable dimensions.

The storage box 1 comprises end walls 7, side walls 9 and a bottom 11 each of which consists of an outer plastic lamination 13, an inner plastic lamination 15 and an intermediate lamination 17 of any suitable insulating medium.

Each of the end and side walls of the storage box 1 is provided with an outwardly extending flange 19. The outwardly extending flanges being continuations of inner and outer laminations 13 and 15, and since I do not extend the intermediate insulation into the flanges the two laminations forming the flanges may be affixed together by heat sealing or in any other suitable manner as at 23.

The storage box may be formed to the design described by molding, press forming or in any other convenient and suitable manner to provide a unitary insulated structure, and the gauge of the inner and outer laminations of plastic material 13 and 15, respectively, is such that the container or storage box will have ample strength and rigidity to stand up under normal and relatively hard usage.

The storage box 1 which is adapted to be packed with foodstuffs is provided with a removable insulated lid which seals and insulates the storage box to maintain the perishable comestibles contained therein in fresh edible condition.

The lid 3 for the storage box 1 is of generally pan-like configuration comprising a plane cover or body section 25 which is dimensionally slightly reduced relative to the width and length of the storage box 1 so that it will fit into the upper part thereof as will be explained. The lid is of insulated construction and the body section 25 thereof comprises an inner lamination 27 and an outer lamination 29, both being formed of a plastic material. The body section is formed with an intermediate lamination of insulating material 31.

The lid 3 is molded or otherwise formed with walls 33 upstanding along each of the edges of the body portion 25, the walls being integral with and forming a continuation of said body portion and therefore comprising two laminations 27 and 29 with the intermediate insulating medium 31.

The transverse wall 33 which extends across what I shall term the front end of the lunch safe is provided with a forwardly extending flange 35 comprising two laminations constituting continuations of walls or laminae 27 and 29, these laminae may be heat sealed or otherwise affixed together into a unit and the insulation preferably is not carried into this flange. The upper surface of flange 35 is bevelled or tapered forwardly to its edge as at 37 for a purpose to be hereinafter explained.

The opposite or rear transverse wall 33 of the lid is provided with a rearwardly extending flange 39 and with a forwardly extending flange 41, the flange 39 preferably comprising continuations of the two laminations 27 and 29 without the intermediate insulation, the two laminations may be heat sealed or otherwise affixed together. The forwardly extending flange 41 may comprise a one piece plastic structure and is formed with a forwardly extending taper or bevel 43 along its edge for a purpose to be described.

Each longitudinal wall 33 is formed with an outwardly extending flange 45 which may be formed of two laminations of plastic constituting continuations of laminations 27 and 29, the insulation preferably being omitted from the flanges 45 and the laminations being sealed together. I provide an upstanding longitudinally extending rib or key 47 along each flange 45 and at the forward end of each rib 47 I provide a bevel or taper 49 and I also taper or bevel the forward end of each flange 45 at the side of the rib as at 51. Thus, at the forward transverse end of the lid 3 there will be a continuous bevel comprising the bevelled surfaces 37, 49 and 51.

It will now be appreciated that the lid 3 of my lunch safe may be operatively positioned extending over and covering the storage box 1 and in such position it is supported or suspended by transverse flanges 35 and 39 and by longitudinal flanges 45 which rest on and are supported by the flanges 19 of the storage box 1, the lid being snugly received partially within the storage compartment.

The cover 5 for the lunch safe is formed of plastic by molding, press forming or in any other suitable manner, and comprises side walls 53 which may converge upwardly and form a curved top surface 55. The cover is formed with what I shall term a leading end wall 57 and a trailing end wall 59, the latter having a depending stop strip 61 which extends below the plane of the lower edge portion 63 of end wall 57. Each end wall may be formed with any suitable reinforcing ribs 65. A handle 67 is provided on and extending upwardly from the top 55 of cover 5.

Each side wall 53 is formed with a thickened longitudinally extending base section 69, each of which is formed with a longitudinally extending groove or keyway 71 formed in the lower surface thereof. Outwardly of the keyway I form an apron or flange 73 depending from the base section 69 and an inwardly directed clamping flange 75 extends from the lower edge of each apron 73.

On the inner surfaces of the side walls 53 of the cover 5 I provide brackets 77 for removably supporting a vacuum bottle 79 within the cover.

The lunch safe of this invention is assembled and used in the following manner: The foodstuff is packed in the insulated storage box whereupon the insulated lid 3 is placed in operative position covering the storage box 1. The lid when operatively associated with the storage box is suspended from the upper edges of walls 7 by means of flanges 35, 39 and 45 so that the body section 29 of the lid covers the storage box and the walls 33 of the lid are in snug arrangement with the walls 7 and 9 of the storage box to thereby seal the interior of the storage box.

The vacuum bottle 79 having been mounted in the cover 5 of the lunch safe assembly the cover is associated with the storage box and the lid by starting to slide the cover thereon with the leading end 57 forming the leading edge in this sliding or enclosing operation. As the cover is slid longitudinally on the storage box and lid the portion 63 of end 57 will ride upon bevels 37, 49 and 51 and as the cover is slid forwardly the keys 47 will be received in the keyways 71 to maintain the cover against lateral movement and the clamping flanges 75 will extend under and in sliding engagement with the outwardly extending flanges on the storage box walls, those flanges and the outwardly extending lid flanges being slidably clamped between the clamping flanges 75 and the lower surface of section 69. After the portion 63 has passed the aforementioned bevels it will be unsupported between its end supports on flanges 45, however as the cover nears the end of its closing stroke it will ride up on bevel 43 and when the cover is fully slid on the assembly the portion 63 will be supported on flange 39 of the lid. As the portion 63 rides up the aforementioned bevel and rests on flange 39 it will be recognized that the clamping action of the clamping flanges 75 will seal the flanges on the lid against those on the storage box to seal the interior of the storage box. The clamping action of the cover not only causes this sealing action but it also permits the lid and storage box to be supported from the cover for carrying the entire assembly by the handle 67. When the cover is fully slid into closed position it will be stopped by end stop strip 61 engaging the ends of the lid and storage box flanges as clearly illustrated in FIG. 3 of the drawings.

It will now be appreciated that I have designed an attractive looking, sanitary lunch safe wherein the contained comestibles will be stored in an insulated container or storage box and wherein the closing action of the cover component of the assembly automatically coacts with the assembly to ensure a sealing of the storage box.

I claim:

1. A lunch safe including, in combination, a generally rectangular storage box, a generally rectangular lid therefor, and a cover, said storage box, lid and cover each having a forward end, said cover being slidably mounted on said storage box and lid for sliding movement to and from closing position, the walls of said storage box being provided with supporting flanges extending outwardly from the upper edges thereof, and said lid having flanges extending outwardly from the edges thereof and resting on and supported by said supporting flanges, a pair of the opposed flanges of the lid each having an upstanding continuous key thereon and each key being bevelled at its forward end, and the other two flanges of said lid having a bevel on the forward edges thereof, and said cover having keyways for receiving said keys for guiding said cover in its sliding movements and means on said cover for engaging and riding upon said bevels when said cover is slid to closing position and further means depending from said cover for clamping the flanges on the supporting flanges to seal the interior of the storage box.

2. A lunch safe in accordance with claim 1, wherein means is provided on the rear end of said cover engageable with said storage box and lid to stop the forward movement of said cover when it is in operative closed position.

3. A lunch safe including, in combination, a generally rectangular storage box, a generally rectangular lid therefor, and a cover, said cover being slidably mounted on said storage box and lid for sliding movement to and from closing position, the walls of said storage box being provided with supporting flanges extending outwardly from the upper edges thereof, and said lid having flanges extending outwardly from two opposing edges thereof, and resting on and supported by said supporting flanges, opposing flanges being provided on the other two edges of said lid, said opposing flanges resting on and supported by said supporting flanges, each of said opposing flanges having a key projecting upwardly therefrom, and said cover having keyways for receiving said keys for guiding said cover in its sliding movements, and means depending from said cover for clamping the opposing flanges on the supporting flanges to seal the interior of the storage box.

4. A lunch safe in accordance with claim 3, wherein said first named pair of flanges on the lid are provided with means coactive with further means on said cover for causing said means on the cover to clamp said pair of opposing flanges to the supporting flanges.

5. A lunch safe in accordance with claim 3, wherein said first named pair of flanges on the lid are provided with bevels for engaging said cover to move it to positions causing the means depending from the cover to clamp said pair of opposing flanges to the supporting flanges.

References Cited in the file of this patent

UNITED STATES PATENTS

| | | |
|---|---|---|
| 1,839,414 | Scherz | Jan. 5, 1932 |
| 2,256,935 | Austin | Sept. 23, 1941 |
| 2,501,894 | Eide | Mar. 28, 1950 |
| 2,807,387 | Siciliano | Sept. 24, 1957 |
| 2,889,443 | Dobmeier | June 2, 1959 |
| 2,944,694 | Kinsey | July 12, 1960 |